United States Patent
Chiang

(10) Patent No.: US 9,616,814 B1
(45) Date of Patent: Apr. 11, 2017

(54) VEHICLE SECURITY ALARMING SYSTEM DETERMINING RELATIVE VELOCITY BETWEEN A FRONT CAR AND A REAR CAR BY SOUNDS RETRIEVED THEREFROM

(71) Applicant: Min-Yueh Chiang, New Taipei (TW)

(72) Inventor: Min-Yueh Chiang, New Taipei (TW)

( * ) Notice: Subject to any disclaimer, the term of this patent is extended or adjusted under 35 U.S.C. 154(b) by 0 days.

(21) Appl. No.: 15/161,016

(22) Filed: May 20, 2016

(51) Int. Cl.
*B60Q 1/00* (2006.01)
*B60Q 9/00* (2006.01)

(52) U.S. Cl.
CPC .................................. *B60Q 9/008* (2013.01)

(58) Field of Classification Search
CPC ....... B60Q 9/008; B60R 21/0134; G08G 1/16
USPC .... 340/435, 436, 438, 425.5, 517, 524, 525; 701/301
See application file for complete search history.

(56) References Cited

U.S. PATENT DOCUMENTS

| | | | |
|---|---|---|---|
| 8,031,085 B1* | 10/2011 | Anderson | B60Q 5/008 340/425.5 |
| 8,136,404 B2* | 3/2012 | Matsumoto | G01S 7/527 180/274 |
| 8,682,004 B2* | 3/2014 | Grigsby | G08G 1/0962 340/435 |

* cited by examiner

*Primary Examiner* — Toan N Pham
(74) *Attorney, Agent, or Firm* — Aeon Law; Adam L.K. Philipp

(57) ABSTRACT

A vehicle security alarming device determining a relative velocity between a front car and a rear car by sounds retrieved therefrom, comprising a vehicle noise processing module, which is configured to process a vehicle noise from the front car and the rear car, amplifying the vehicle tire sound and engine sound after filtering the wind shear sound, thereby obtaining an average voltage value; a comparing and determining module; and an alarming module. The comparing and determining module receives the vehicle noise processing data and stores the voltage value of the vehicle noise processing data in a sequence according to time of occurrence for the comparing and determining module to compare and determine whether the rear car is approaching the vehicle, and output an alarming information, where the alarming module electrically connects to the comparing and determining module and sends out an alarming signal after receiving the alarming information.

10 Claims, 7 Drawing Sheets

VEHICLE SECURITY ALARMING SYSTEM DETERMINING RELATIVE VELOCITY BETWEEN A FRONT CAR AND A REAR CAR BY SOUNDS RETRIEVED THEREFROM

FIELD OF THE INVENTION

The present invention relates to a vehicle security system, and more particularly to a vehicle security alarming device for detecting distances between vehicles by determining relative speed between a front car and a rear car with sounds retrieved therefrom.

BACKGROUND OF THE INVENTION

Vehicle security systems can be classified into a passive security system and an active security system. The passive security system such as airbag or high-rigidity vehicle body is configured to initialize the protecting mechanism while after a vehicle collision occurs, whereas the active security system initializes the protecting mechanism whenever there exist potential danger so as to reduce or eliminate the risk of vehicle colliding. The active security system includes system measuring distances between vehicles by utilizing radar electromagnetic waves, image processing, or radar detection, thereby assisting drivers to determine the proper driving speed and directions.

However, the energy in radar electromagnetic waves decreases under pouring rain. Also, under pouring rain, there exists cross-polarization interference problem caused by scattering effect, which leads to inaccurate detection. Other detection method such as image processing and radar detection will also be affected by bad weather condition, which also leads to inaccurate detection. Therefore, no matter what detection method is chosen, the accuracy of the detection is susceptible to weather condition, which leads to drivers' misjudgments and possible danger.

SUMMARY OF THE INVENTION

The tire noise is ninety-one point five percent (91.5%) of the vehicle noise when a vehicle is running at a high speed. Also, vehicles make louder noises running in rainy weather than in dry weather. Aiming to solve the issue of inaccurate detection because of bad weather in prior art, the object of the present invention is to provide a vehicle security device which determines a relative speed between a front car and a rear car by utilizing the sounds obtained from the front car and the rear car.

To solve the problem in prior art, the present invention provides a vehicle security alarming device determining a relative velocity between a front car and a rear car by sounds retrieved therefrom, comprising: a vehicle noise processing module, a comparing and determining module, and an alarming module. The vehicle noise processing module is configured to process a vehicle noise from the front car and the rear car by obtaining vehicle noise storage-voltage data respectively during a first collecting time point $t_n$ and a second collecting time point $t_{n+1}$. The comparing and determining module then compare the average voltage values stored in the vehicle noise in a sequence according to time of occurrence, thereby obtaining driving speed information and driving direction information of the front car and the rear car, wherein the comparing and determining module outputs alarming information when the driving speed and driving direction of the front car and the rear car indicate that the rear car is approaching. The alarming module electrically connects to the comparing and determining module to receive the alarming information so as to correspondingly send out an alarming signal.

In one embodiment of the present invention, the vehicle noise includes a tire sound and an engine sound from the front car and the rear car.

In one embodiment of the present invention, the vehicle noise processing module includes a sound retrieving unit, a vehicle noise filtering unit, a demodulator, and a signal storage unit, wherein the sound retrieving unit retrieves a surrounding environmental sound existing around the vehicle, and the vehicle noise filtering unit, which is in signal communication with the sound retrieving unit to filter the surrounding environmental sound existing around the vehicle according to a predetermined vehicle-noise frequency range to obtain the vehicle noise, and the demodulator which electrically connects to the vehicle noise filtering unit and the signal storage unit to perform digital-to-analog conversion to convert the vehicle noise into the vehicle noise storage-voltage data and to store the vehicle noise voltage-storage data in the signal storage unit.

In one embodiment of the present invention, the predetermined vehicle-noise frequency is in a range between 800 Hz to 16000 Hz.

In one embodiment of the present invention, the demodulator converts a sound amplitude variation of the vehicle noise into a magnitude variation of direct current, thereby obtaining the vehicle noise storage-voltage data.

In one embodiment of the present invention, the vehicle noise filtering unit includes a filter and an operational amplifier, in which the filter is in signal communication with the sound retrieving unit to filter the surrounding environmental sound existing around the vehicle to obtain the amplified vehicle noise, and the operational amplifier is electrically connected to the filter to amplify the vehicle noise obtained by filtering the surrounding environmental sound existing around the vehicle.

In one embodiment of the present invention, the surrounding environmental sound existing around the vehicle includes a tire sound, an engine sound, and a wind shear sound.

In one embodiment of the present invention, the comparing and determining module includes a clock signal generator and a comparator, in which the comparing and determining module performs fixed-time sampling according to the clock signal provided by the clock signal generator, and the comparator determines whether the rear car is approaching according to a variation degree of the surrounding environmental sound obtained in a time period between the first collecting time point $t_n$ and the second collecting time point $t_{n+1}$.

In one embodiment of the present invention, the alarming module is installed on a dashboard and/or installed on a left rear-view mirror or a right rear-view mirror of the vehicle.

In one embodiment of the present invention, the alarming module includes a switch unit, which electrically connects to the comparing and determining module to change the turn-signal displaying color on the dashboard.

The vehicle security alarming device determining a relative velocity between a front car and a rear car by sounds retrieved therefrom provides the following effects. To solve the problem that the detection of distances between vehicles by using radar electromagnetic wave or laser light is susceptible to weather conditions, the vehicle security alarming device of the present invention adopts the vehicle noise processing module that is insusceptible to weather to enhance the accuracy of detection. The present invention utilizes the vehicle noise processing module to collect the vehicle noise and filter out the wind shear frequency in the vehicle noise, after which the comparing and determining module determines the driving direction of the rear approaching vehicles. At last, the alarming module sends an alarming signal to the driver and the rear approaching car so as to avoid traffic accidents.

DETAILED DESCRIPTION OF THE PREFERRED EMBODIMENTS

Figure 1:
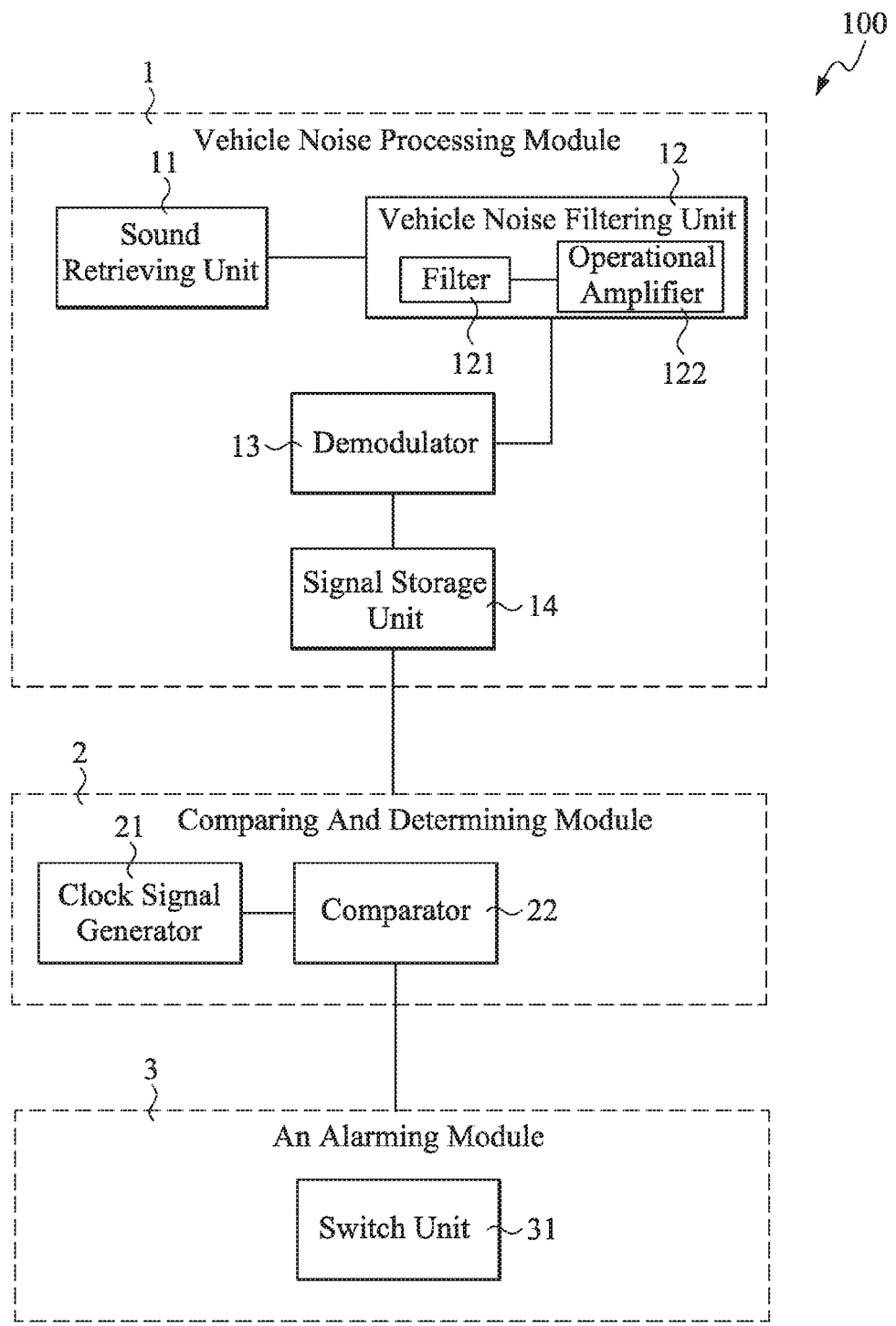
FIG. 1 shows a block diagram illustrating a vehicle security alarming device determining a relative velocity between a front car and a rear car by sounds retrieved therefrom which determines a relative speed between a front car and a rear car according to one embodiment of the present invention.

The preferred embodiments of the present invention are further described below with reference to FIG. 1 to FIG. 7. The description is used for explaining the embodiments of the present invention, but not for limiting the scope of the claims.

As shown in FIG. 1 to FIG. 6, an embodiment of the present invention provides a vehicle security alarming device determining a relative velocity between a front car and a rear car by sounds retrieved therefrom 100, comprising a vehicle noise processing module 1, a comparing and determining module 2, and an alarming module 3.

Specifically, the vehicle noise processing module 1 is configured to process a vehicle noise from a rear car C2, a vehicle at the back of the vehicle C1, by obtaining vehicle noise processing data D1' and D2'. More specifically, vehicle noise processing data D1' and D2' refer to the vehicle noise processing data obtained from the rear car C2 during a first collecting time point $t_n$ and a second collecting time point $t_{n+1}$ respectively, wherein $t_{n+1}$ represents a time point later than $t_n$. For example, $t_n$ can be the third second, and $t_{n+1}$ can be any time point later than the third second. In this embodiment, the vehicle noise processing module 1 includes a sound retrieving unit 11, a vehicle noise filtering unit 12, and a demodulator 13.

Figure 2:
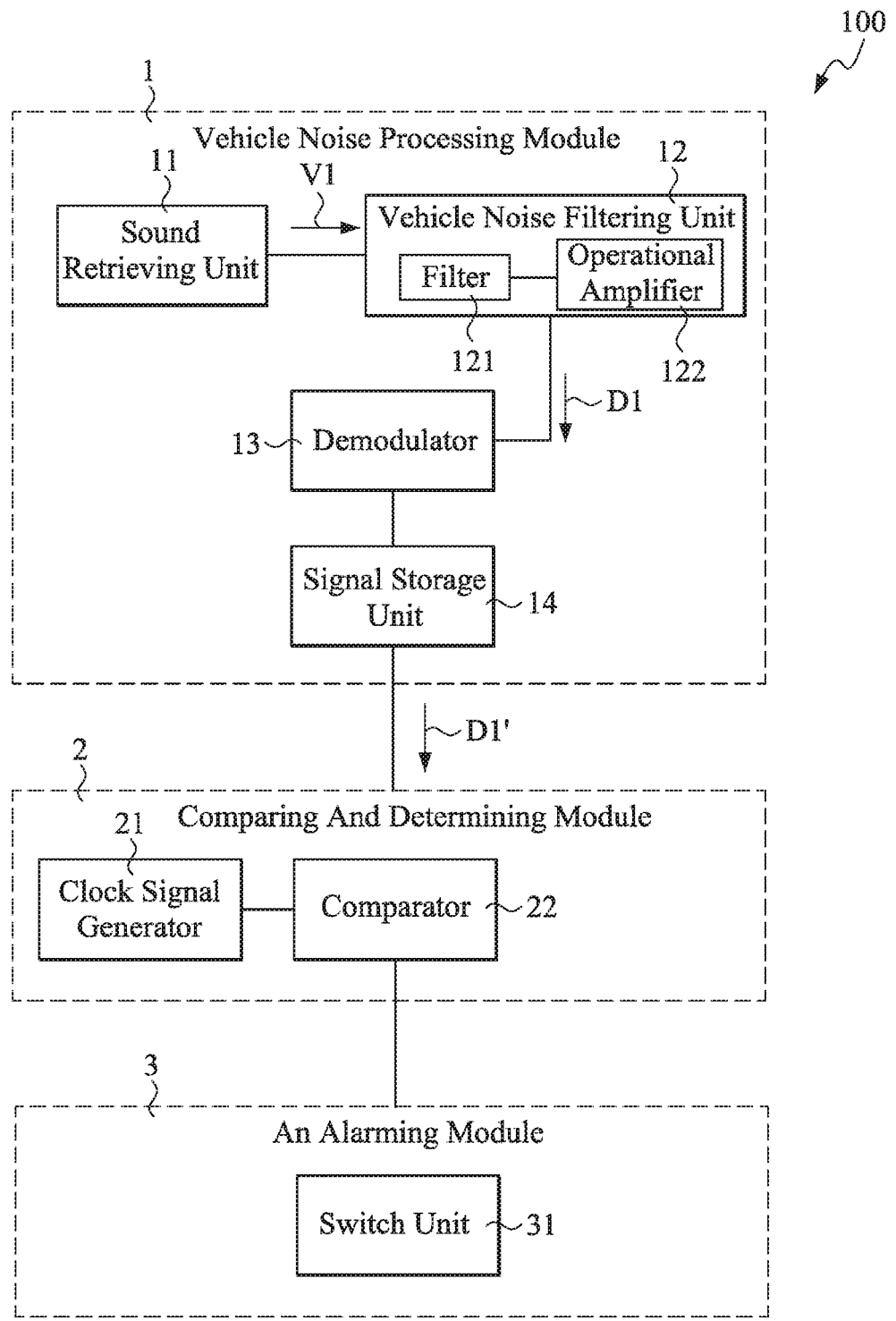
FIG. 2 shows a block diagram illustrating the vehicle security alarming device determining a relative velocity between a front car and a rear car by sounds retrieved therefrom according to the embodiment of the present invention at a first collecting time point $t_n$.
Figure 3:
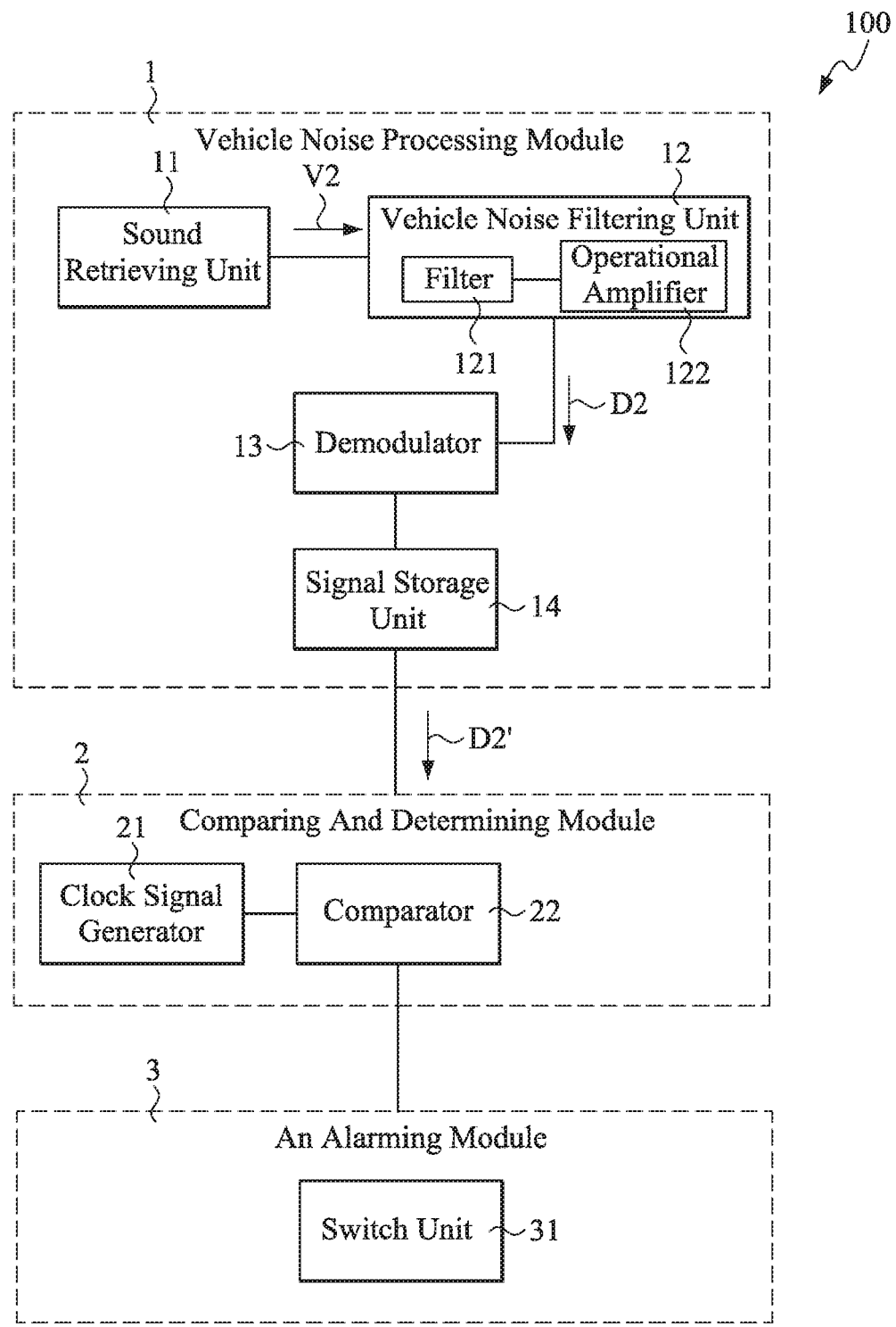
FIG. 3 shows a block diagram illustrating the vehicle security alarming device determining a relative velocity between a front car and a rear car by sounds retrieved therefrom according to the embodiment of the present invention at a second collecting time point $t_{n+1}$.

As shown in FIG. 2, the sound retrieving unit 11 retrieves during the first collecting time point $t_n$ a surrounding environmental sound V1 collected by the vehicle C1, and, as shown in FIG. 3, retrieves during the second collecting time point $t_{n+1}$ a surrounding environmental sound V2 collected by the vehicle C1. More specifically, the surrounding environmental sounds V1 and V2 include a tire sound, an engine sound, and a wind shear sound from the rear car C2, wherein the tire sound corresponds to sound information of the sound made by the friction between the tire of the rear car C2 and the floor.

The vehicle noise filtering unit 12 is in signal communication with the sound retrieving unit 11 to filter the surrounding environmental sound V1 existing around the vehicle C1 according to a predetermined vehicle-noise frequency range to obtain the vehicle noise D1 and D2. In this embodiment, the predetermined vehicle-noise frequency range for sunny days and raining days in downtowns and highways is the frequency range of engine, which is in a range from 800 Hz to 16000 Hz. It is noted that the tire sounds obtained in rainy days are more recognizable since the volume of the tire sounds in rainy days is higher than that in other weather conditions. More specifically, the vehicle noise filtering unit 12 includes a filter 121 and an operational amplifier 122. The filter 121 electrically connects to the sound retrieving unit 11 to filter the surrounding environmental sound V1 and V2 existing around the vehicle and then obtain the vehicle noise D1 and D2 according to the predetermined vehicle-noise frequency range. The operational amplifier 122 electrically connects to the filter 121 to amplify the vehicle noise D1 and D2 obtained by filtering the surrounding environmental sound existing around the vehicle.

The demodulator 13 electrically connects to the vehicle noise filtering unit 12 and the signal storage unit 14 to perform digital-to-analog conversion to convert the vehicle noise D1 and D2 into the vehicle noise storage-voltage data D1' and D2' and to store the vehicle noise voltage-storage data D1' and D2' in the signal storage unit 14 in a sequence according to time of occurrence.

As shown in FIG. 1 to FIG. 3, the comparing and determining module 2 electrically connects to the vehicle noise processing module 1 to receive the vehicle noise storage-voltage data D1' and D2', and derive a driving information of the rear approaching vehicle according to the volume variation of the vehicle noise storage-voltage data D1' and D2', wherein the comparing and determining module 2 outputs alarming information D3 when the vehicle noise storage voltage obtained during the second collecting time point $t_{n+1}$ is higher than the vehicle noise storage voltage obtained during the first collecting time point $t_n$. More specifically, the comparing and determining module 2 includes a clock signal generator 21 and a comparator 22, in which the comparing and determining module 2 performs fixed-time sampling on the vehicle noise processing data D1' and D2' according to the clock signal provided by the clock signal generator 21. The comparator 22 electrically connects to the clock signal generator 21 to determine whether the rear car is approaching according to a degree of variation of the surrounding environmental sound volume by comparing the vehicle noise processing data D1' and D2' obtained at the first collecting time point $t_n$ and the second collecting time point $t_{n+1}$.

Figure 4:
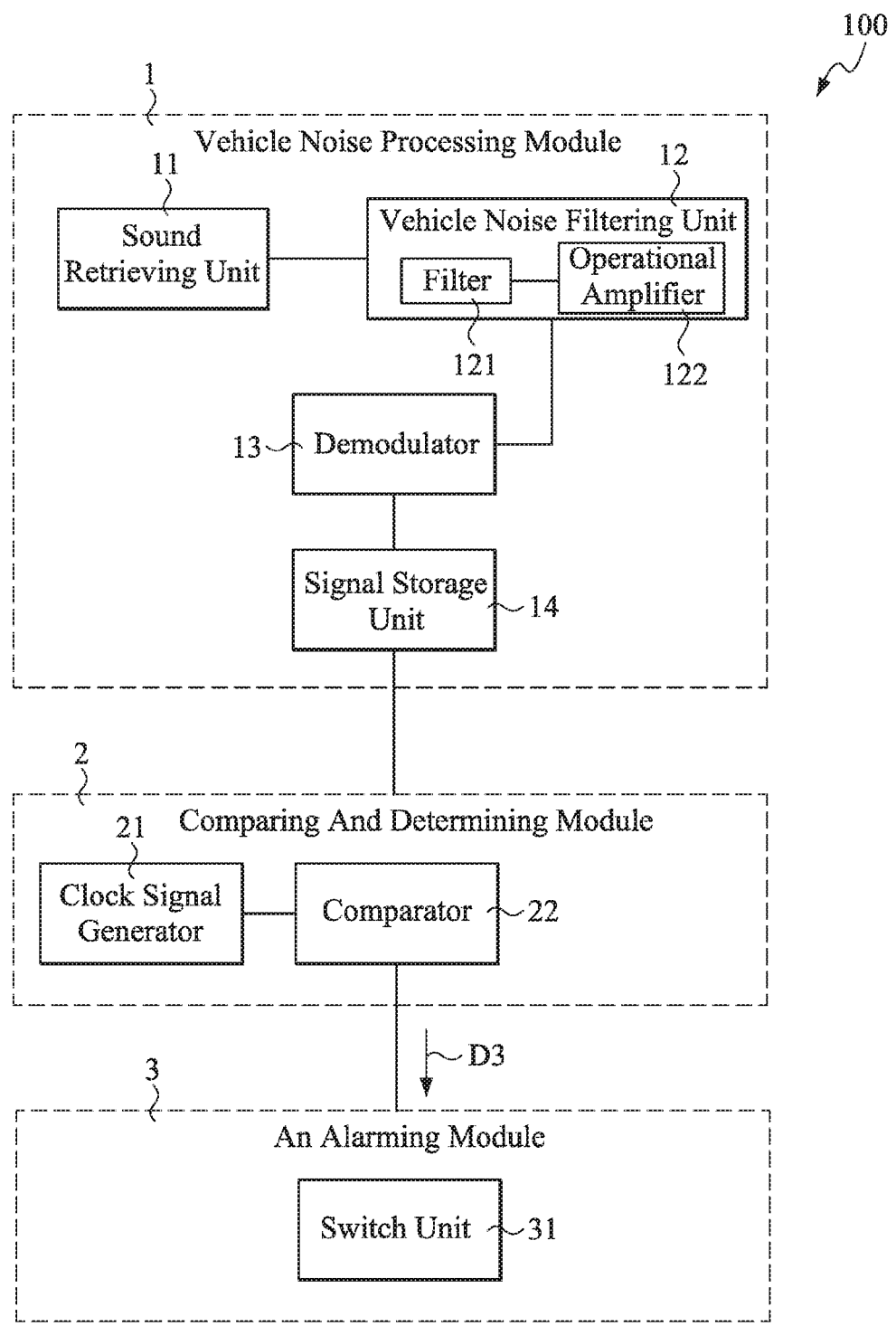
FIG. 4 shows a block diagram illustrating the vehicle security alarming device determining a relative velocity between a front car and a rear car by sounds retrieved therefrom according to the embodiment of the present invention outputting alarming information.
Figure 5:
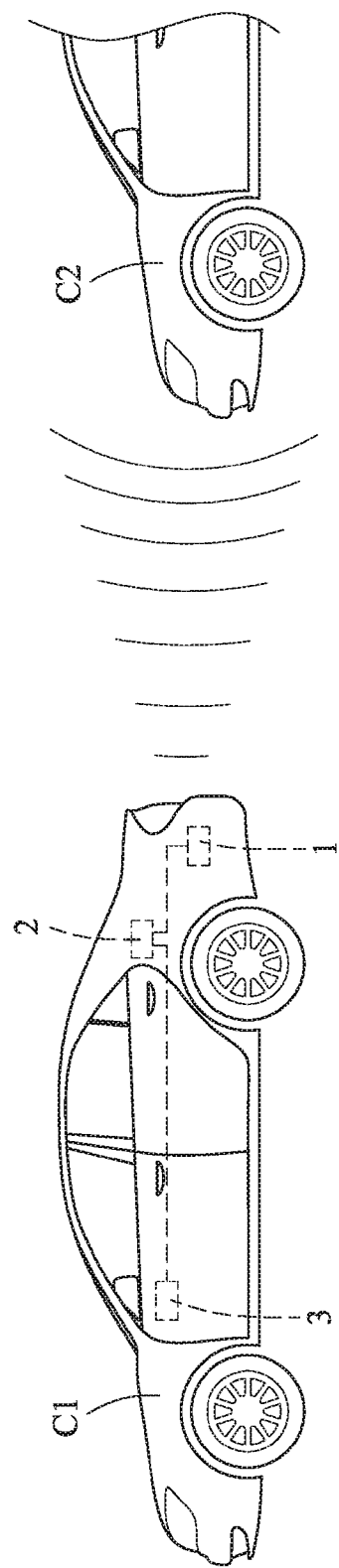
FIG. 5 shows a schematic diagram illustrating the vehicle security alarming device determining a relative velocity between a front car and a rear car by sounds retrieved therefrom according to the embodiment of the present invention at the first collecting time $t_n$.
Figure 6:
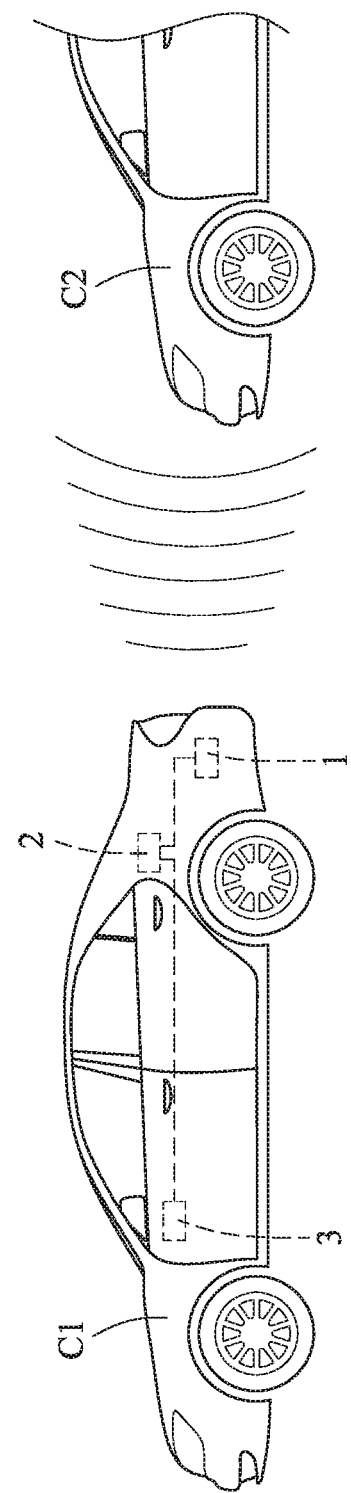
FIG. 6 shows a schematic diagram illustrating the vehicle security alarming device determining a relative velocity between a front car and a rear car by sounds retrieved therefrom according to the embodiment of the present invention at the second collecting time $t_{n+1}$.
Figure 7:
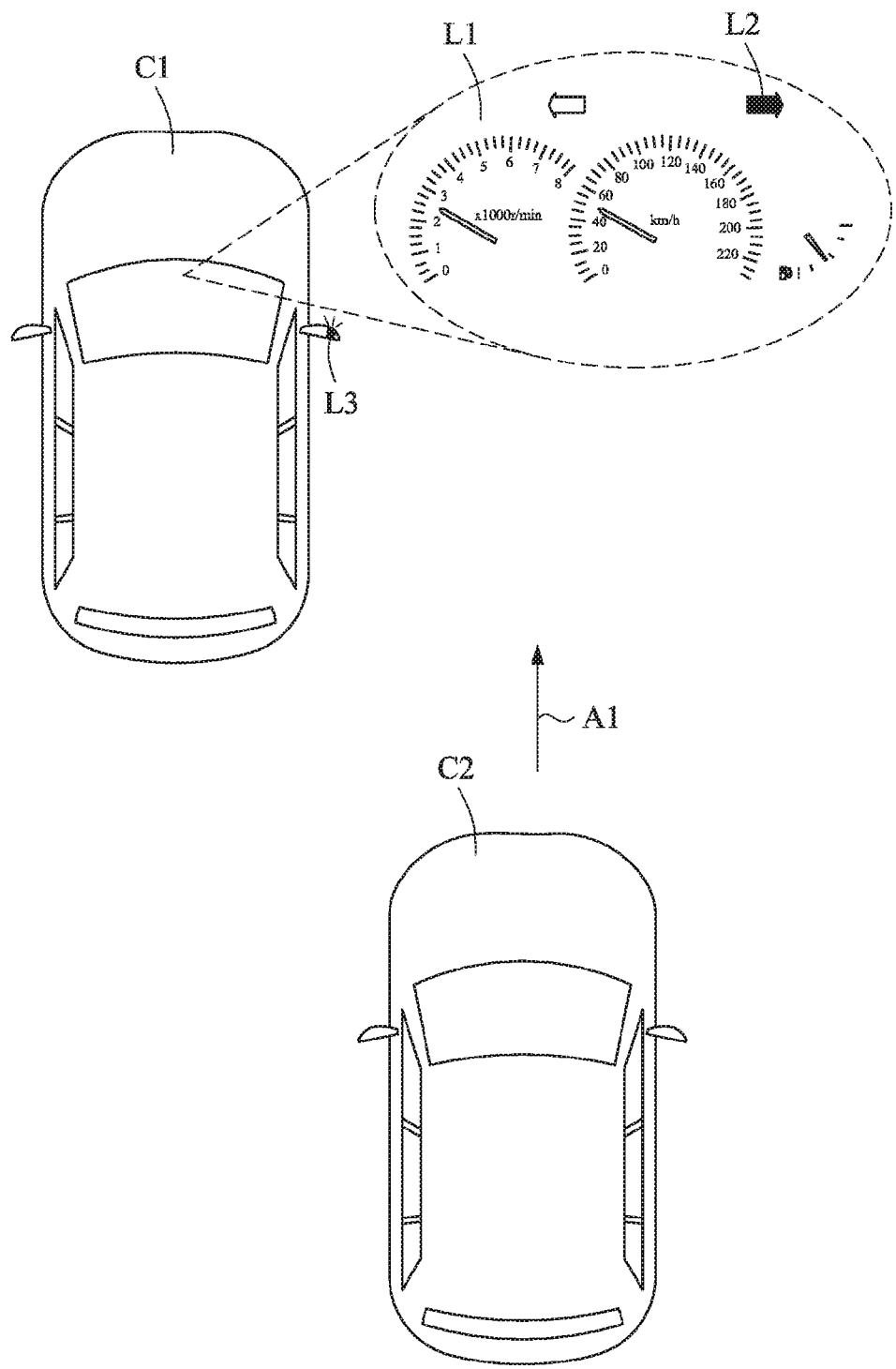
FIG. 7 is a schematic diagram illustrating the vehicle security alarming device determining a relative velocity between a front car and a rear car by sounds retrieved therefrom outputting alarming information according to the embodiment of the present invention.

As shown in FIG. 4 to FIG. 6, the alarming module 3 electrically connects to the comparing and determining module 2 to receive alarming information D3 and send out an alarming signal accordingly. In this embodiment, the alarming module 3 includes a light signal unit L2 configured on a dashboard L1 on the vehicle C1, and two turn signal lights L3 configured on a left rear-view mirror and a right rear-view mirror of the vehicle C1, which are used to alarm the driver of the vehicle C1 and the driver of the rear car C2 that the vehicle C1 and the rear car C2 are too close. Certainly, the present invention is not limited to the above description. The alarming module 3 can also include a sound generator, a vibrator, and other devices that can act as alarming devices. Preferably, the alarming module 3 includes a switch unit 31 which is electrically connected to the comparing and determining module 2. The switch unit 31 changes the displaying color of the light signal unit L2 on the dashboard L1 according to the alarming information D3. The change of the displaying color includes turning the turn signal lights on the dashboard from their original colors into red.

As shown in FIG. 1 to FIG. 7, the actuation method of the vehicle security alarming device determining a relative velocity between a front car and a rear car by sounds retrieved therefrom 100 according to this embodiment of the present invention will be described in detail below. First, the sound retrieving unit 11 retrieves a surrounding environmental sound existing around the vehicle V1 during the first collecting time point $t_n$, and retrieves a surrounding environmental sound existing around the vehicle V2. The filter 121 filters the surrounding environmental sound existing around the vehicle V1 and V2 to obtain the vehicle noise D1 and D2 according to the predetermined vehicle-noise frequency range, in which the surrounding environmental sound existing around the vehicle V1 and V2 includes a tire sound data, an engine sound data, and a wind shear sound data. The operation amplifier 122 receives a vehicle noise data from the filter 121, and amplifies the amplitude of the vehicle noise data, after which the demodulator 13 transforms the amplitude of the vehicle noise D1 and D2 into direct current signal thereby obtaining the vehicle noise processing data D1' and D2'. Next, the comparing and determining module 2 receives the vehicle noise processing data D1' and D2', which are fixed sampled by the comparing and determining module 2 via the clock signal generator 21, and the comparing and determining module 2 outputs alarming information D3 to the alarming module 3 if the comparing and determining module 2 determines that the rear approaching vehicle is getting closer. For instance, as shown in FIG. 4 to FIG. 6, when the driver of the vehicle C1 intends to turn right into a driveway, while the rear car C2 is progressing acceleratedly in a direction A1. Under the circumstances, the comparing and determining module 2 send alarming information D3 to the alarming module 3, and the alarming module 3 change the displaying color of the light signal unit L2 and the turn signal lights L3 so that the light signal unit L2 and the turn signal lights L3 show red light, warning the drivers that the rear car C2 is approaching the vehicle C1.

The above description is only an explanation of the preferred embodiment of the present invention. A person with ordinary skill in the art can make various modifications to the present invention. However, such modifications still fall within the spirit and scope defined by the claims of the present invention appended below.

What is claimed is:

1. A vehicle security alarming device determining a relative velocity between a front car and a rear car by sounds retrieved therefrom, comprising:
   a vehicle noise processing module configured to process a vehicle noise from the front car and the rear car by obtaining vehicle noise storage-voltage data respectively during a first collecting time point $t_n$ and a second collecting time point $t_{n+1}$;
   a comparing and determining module electrically which connects to the vehicle noise processing module to receive and compare the vehicle noise storage-voltage data obtained during the first collecting time point $t_n$ with the vehicle noise storage-voltage data obtained during the second collecting time point $t_{n+1}$ so as to obtain a rear car approaching data, wherein the comparing and determining module outputs alarming information when the vehicle noise storage voltage obtained during the second collecting time point $t_{n+1}$ is higher than the vehicle noise storage voltage obtained during the first collecting time point $t_n$; and
   an alarming module which electrically connects to the comparing and determining module to receive the alarming information so as to correspondingly send out an alarming signal.

2. The vehicle security alarming device as claimed in claim 1, wherein the vehicle noise includes a tire sound and an engine sound from the front car and the rear car.

3. The vehicle security alarm device as claimed in claim 1, wherein the vehicle noise processing module includes a sound retrieving unit, a vehicle noise filtering unit, a demodulator, and a signal storage unit, wherein the sound retrieving unit retrieves a surrounding environmental sound existing around the vehicle, and the vehicle noise filtering unit, which is in signal communication with the sound retrieving unit to filter the surrounding environmental sound existing around the vehicle according to a predetermined vehicle-noise frequency range to obtain the vehicle noise, and the demodulator which electrically connects to the vehicle noise filtering unit and the signal storage unit to perform digital-to-analog conversion to convert the vehicle noise into the vehicle noise storage-voltage data and to store the vehicle noise voltage-storage data in the signal storage unit.

4. The vehicle security alarm device as claimed in claim 3, wherein the predetermined vehicle-noise frequency range is in a range between 800 Hz to 16000 Hz.

5. The vehicle security alarm device as claimed in claim 3, wherein the demodulator converts a sound amplitude variation of the vehicle noise into a magnitude variation of direct current, thereby obtaining the vehicle noise storage-voltage data.

6. The vehicle security alarm device as claimed in claim 3, wherein the vehicle noise filtering unit includes a filter and an operational amplifier, in which the filter is in signal communication with the sound retrieving unit to filter the surrounding environmental sound existing around the vehicle to obtain the amplified vehicle noise, and the operational amplifier is electrically connected to the filter to amplify the vehicle noise obtained by filtering the surrounding environmental sound existing around the vehicle.

7. The vehicle security alarm device as claimed in claim 3, wherein the surrounding environmental sound existing around the vehicle includes a tire sound, an engine sound, and a wind shear sound.

8. The vehicle security alarm device as claimed in claim 3, wherein the comparing and determining module includes a clock signal generator and a comparator, in which the comparing and determining module performs fixed-time sampling according to the clock signal provided by the clock signal generator, and the comparator determines whether the rear car is approaching according to a variation degree of the surrounding environmental sound obtained in a time period between the first collecting time point $t_n$ and the second collecting time point $t_{n+1}$.

9. The vehicle security alarm device as claimed in claim 1, wherein the alarming module is installed on a dashboard and/or installed on a left rear-view mirror or a right rear-view mirror of the vehicle.

10. The vehicle security alarm device as claimed in claim 1, wherein the alarming module includes a switch unit, which electrically connects to the comparing and determining module to change the turn-signal displaying color on the dashboard according to the alarming information.

* * * * *